Patented Dec. 26, 1939

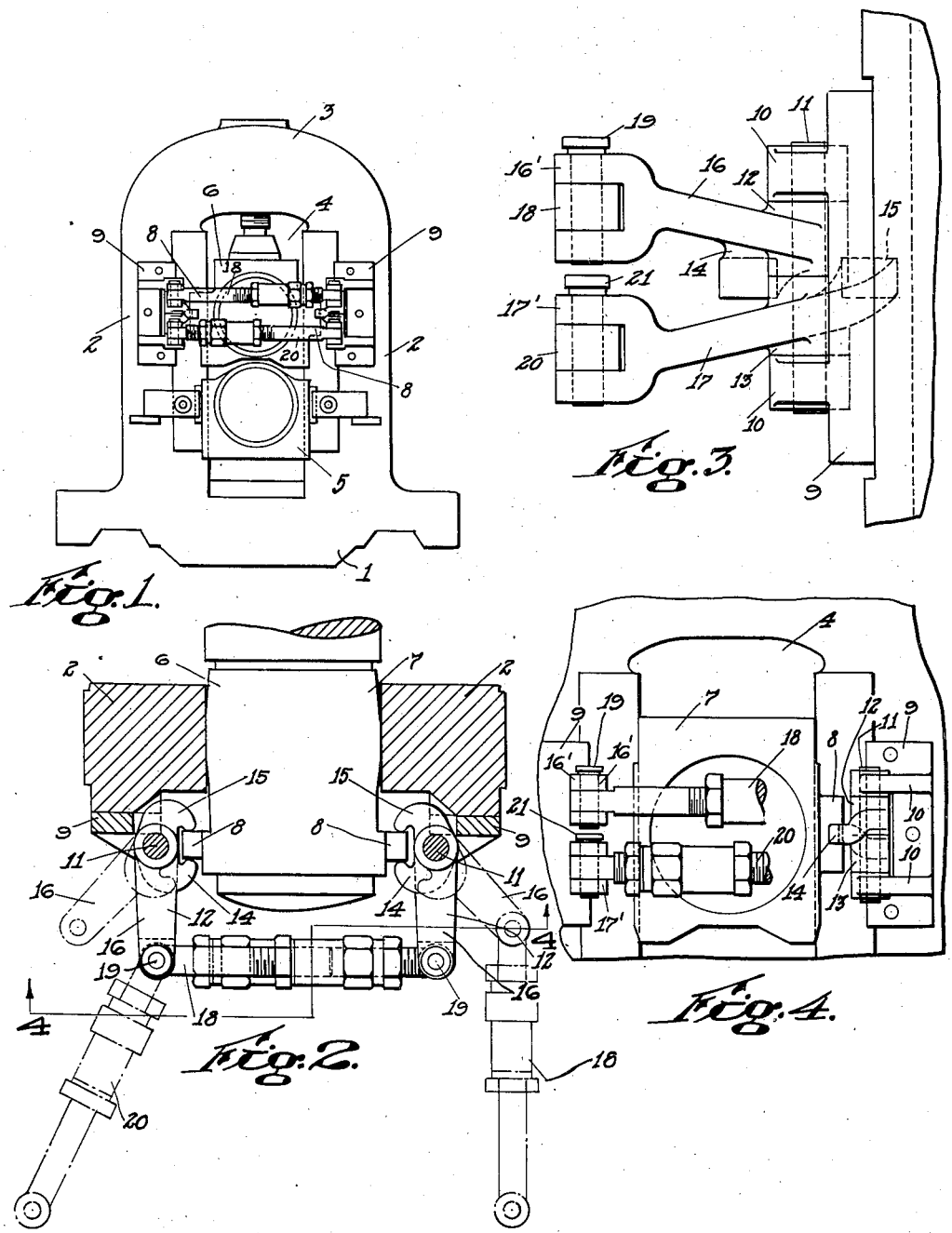

2,184,463

UNITED STATES PATENT OFFICE 2,184,463

RETENTION OF BEARINGS IN ROLL HOUSINGS AND THE LIKE

Myles Morgan, Worcester, Mass., assignor to Morgan Construction Company, Worcester, Mass., a corporation of Massachusetts Application January 14, 1936, Serial No. 59,107

14 Claims. (Cl. 80—56)

The present invention relates to the retention and adjustment of bearings in a roll housing, or like environment. The invention resides in an arrangement which clamps a roll neck bearing securely against endwise movement in either direction, and which wholly eliminates the effect of any backlash or play in the clamping devices. Said arrangement at the same time avoids any cramping of the bearing, by allowing the same to aline or conform itself to the position assumed in operation by the journalled roll or like element. The arrangement further lends itself to particularly easy and simple endwise adjustments of the bearings, to obtain close and accurate alinement of the roll passes; also it affords the utmost facility in the removal or demounting of the rolls and their bearings from the housing. Other and further objects and advantages of the invention will be apparent from the following detailed description thereof, taken in connection with the accompanying drawing, in which—

Fig. 1 is a side or end view of a rolling mill housing, showing my invention applied to the bearing for the upper roll.

Fig. 2 is a fragmentary horizontal sectional view, on an enlarged scale, showing in full lines the operative position of the retaining means, and in broken lines the opened-up position, permitting removal of the bearing.

Fig. 3 is a fragmentary large scale side elevation of a pair of oppositely-acting bell crank levers which form part of the retaining devices.

Fig. 4 is a fragmentary large scale end elevation of the retaining devices, as viewed from the plane of the line 4—4, Fig. 2.

Like reference characters refer to like parts in the different figures.

In Fig. 1, illustrating one side of a conventional roll housing 1, the housing posts or uprights 2, 2 and the cap portion 3 define the usual window 4, which receives, one above the other, the bearings 5 and 6 for the lower and upper rolls, respectively. Such bearings may be of any known type, either plain or anti-friction, the construction of the same, per se, forming no part of the present invention. However, it is to be noted that the bearing to which my invention is applied (here shown as the upper bearing 6) is preferably of a type capable of taking the end thrust from the roll in both directions; this makes possible the full control of the roll's endwise position by the use of my improved bearing retaining means at the "working" end only of the roll,—thus avoiding any interference with the driving means at the other end of the roll.

As shown in the drawing, the bearing's casing or chock portion 7, whose sides have a sliding fit in the window 4, has opposite lateral projections or lugs 8, 8 for engagement by the clamping devices which hold the bearing against endwise movement in the housing, but the construction and arrangement of said clamping devices and their cooperation with said lugs 8, 8 is radically different from that usually employed with similar lateral projections or lugs on the chock or casing portion of a roll housing bearing. In the present instance, the arrangement is such that the lateral projections 8, 8 are appreciably spaced from the outside surfaces of the housing uprights 2, 2, so that the interior surfaces of said lugs, as well as their exterior surfaces, are accessible for engagement by the clamping devices now to be described.

As shown in the drawing, each housing upright 2, 2 has suitably secured thereto a bracket 9, the latter supporting in vertically spaced ears 10, 10 thereof an elongated pintle or pivot shaft 11, there being, of course, two such upright pintles, one associated with each of the lateral projections 8, 8 of the bearing. Each pintle 11 serves as the fulcrum for a pair of bell crank levers 12 and 13, having hub portions arranged one above the other on said pintle; the upper lever 12 has a short arm 14 projecting outwardly from its hub, said arm 14 curving downwardly, so that its free end is in substantially the same horizontal plane as the opposed free end of an upwardly curved short arm 15 of the lower lever 13, said short arm 15 extending inwardly from the hub of lever 13, so as to make engagement with the inner surface of the adjacent bearing lug 8, in opposition to engagement of arm 14 with the outer surface of said bearing lug 8.

The levers 12 and 13 have the longer arms 16 and 17, respectively, both extending outwardly, one above the other, from the fulcrum or hub portions, and bifurcated or forked at their free ends, as shown at 16' and 17'; these longer arms 16 and 17 are preferably divergent from each other in the vertical plane, in order to space their free ends sufficiently apart. A suitable adjustable turnbuckle 18 connects the forked free ends 16' of the two upper levers 16, 16, the ends of the turnbuckle being received between the bifurcations and being apertured to receive removable pins or pivots 19, 19 that pass through registering apertures of the bifurcations. When the turnbuckle 18 is expanded or increased in length, the consequent spreading apart of the two connected upper lever arms 16, 16 retracts the shorter arms 14, 14 of said upper levers 12, 12 and thus relieves the pressure exerted inwardly by said short arms against the bearing lugs or projections 8, 8. Conversely, a shortening or contraction of turnbuckle 18 draws the upper lever arms 16, 16 together, thereby thrusting inwardly on the bearing projections 8, 8 through the short arms 14, 14 of the two upper levers 12, 12.

A companion adjustable turnbuckle 20 forms the connection, by means of removable pins 21, 21, between the forked ends 17' of the lower lever arms 17, 17—an expansion or lengthening of this turnbuckle, to spread said arms apart, causing the short arms 15, 15 of the two lower levers 13, 13 to exert an outward pressure on the bearing lugs 8, 8, while conversely, a shortening or contraction of the turnbuckle 20 relieves such outward pressure, and permits the bearing to be moved inwardly, in response to shortening or contraction of the turnbuckle 18. It will be evident that this arrangement provides for the very firm clamping of the bearing projections 8, 8 on each side between the opposed ends of the short arms 14 and 15 of each pair of levers; that is to say, the bearing projections 8, 8 are, in effect, engaged on each side by cooperating jaws which, through operation of said turnbuckles 18 and 20, can be made to grip and hold the bearing tightly in any desired position of endwise adjustment thereof. The turnbuckles are mutually cooperative; the shortening of turnbuckle 18 that produces a tightening movement of the jaws 14, 14 has the effect also of putting the turnbuckle 20 under compression, while the lengthening of turnbuckle 20 which produces tightening movements of the jaws 15, 15 has also the effect of putting the turnbuckle 18 under tension.

These conditions of tension and compression in the turnbuckles 18 and 20, respectively, give absolute assurance of the elimination of the effects of any backlash or play, in the functioning of the clamping devices. That is to say, the arrangement is such that the jaw-tightening operation of either turnbuckle 18 or 20 obtains automatically the take-up of all lost motion or play, not only in the parts directly associated therewith, but also in the parts associated with the other of said turnbuckles. This makes any endwise adjustment of the bearing, and its secure clamping in the desired position, a very simple and quickly-performed operation; one turnbuckle is first slackened off, and the other is then operated to move the bearing the desired amount; if such movement be less than that permitted by the slackening off of the first turnbuckle, the latter is then operated in the other direction to reestablish the grip of the pairs of jaws 14, 15 on the two bearing projections 8, 8.

With other devices used heretofore for the retention of a roll neck bearing, and for the endwise adjustment of the roll, it has been possible to place serious cramping forces on the bearing, even independently of the forces set up by the rolling operation, thus causing undue friction, heating, wear and loss of power. But with my improved bearing retaining and roll adjusting devices, no such cramping, nor even any cramping, due to the powerful forces tending to shift or tip the bearing axis when the roll is in operation, is possible,—because the jaws 14, 14 and 15, 15 automatically adapt and conform themselves to such conditions, due to the mounting of both turnbuckles 18 and 20 which gives them limited parallel motions on the centers provided by the two pintle shafts 11, 11.

The arrangement of retaining devices above described lends itself to very quick and easy removal and replacement of bearings and rolls. It is only necessary to slack off very slightly one of the turnbuckles 18 or 20, this automatically relieving the tension or compression, as the case may be, of the other turnbuckle and permitting any of the pins 19 or 21 to be withdrawn. Withdrawal of one only of each of such pins is all that is needed; for example, removal of the left hand pin 19 from turnbuckle 18 allows the latter to be swung outwardly, as shown by the broken lines in Fig. 2,—both arms 16, 16 being swung outwardly at the same time to carry the jaws 14, 14 clear of the bearing lugs 8, 8; one of the pins 21 for the other turnbuckle 20 is also removed, and this allows the latter to be swung to its broken line position, Fig. 2, thus clearing the way for endwise withdrawal of the bearing and roll from window 4.

I claim:

1. In a roll housing or the like, a bearing, a pair of retaining members therefor positioned to resist outward endwise movement thereof and so pivoted as to be turned in opposite directions by such movement, a second pair of retaining members positioned to resist inward endwise movement of the bearing and so pivoted as to be turned in opposite directions by such movement, and a link, adjustable in length, connecting the two members of each such pair, one of said links being under tension and the other being under compression in the operative positions of said members.

2. In a roll housing or the like, a bearing, and retaining means for same comprising opposed pairs of members carried by said housing on opposite sides of the bearing axis and in position to resist, respectively, the outward and inward endwise movement of said bearing, and an adjusting device for each pair, common to both members thereof, one adjusting device being under tension and the other being under compression in the operative positions of said members.

3. In a roll housing or the like, a bearing, and retaining means for said bearing consisting of oppositely acting pairs of members so engaging the bearing as to resist, respectively, its inward and outward endwise movements, and characterized by the provision of an adjusting device for each pair, common to both members thereof.

4. In a roll housing or the like, a bearing, a set of movable members carried by the housing and arranged to oppose outward movement of said bearing, a second set of movable members carried by the housing and arranged to oppose inward movement of said bearing, a single adjusting device for each set, common to the members thereof and means providing a limited parallel motion for each adjusting device, in yielding to movement of said bearing, thereby to avoid cramping of said bearing in operation.

5. In a roll housing or the like, a bearing, and retaining means therefor comprising pivoted members engaging said bearing to oppose its outward movement, and other pivoted members engaging said bearing to oppose its inward movement, the first-mentioned members having a link connection adjustable in length to limit the bearing's outward movement, and the second-mentioned members having a link connection adjustable in length to limit the bearing's inward movement.

6. In a roll housing or the like, a bearing, and retaining means therefor comprising pivoted members opposed to outward bearing movement, and other pivoted members opposed to inward bearing movement, the first-mentioned members having a link connection adjustable in length to limit the bearing's outward movement, and the second-mentioned members having a link connection adjustable in length to limit the bearing's inward movement, one of said link connections being under tension and the other being under compression.

7. In a roll housing or the like, a bearing, and retaining means for same comprising a pair of pivoted members arranged in opposition to outward movement of said bearing, a second pair of pivoted members arranged in opposition to inward movement of said bearing, a parallel motion link connecting the first pair of members and placed under tension by the outward thrust on said bearing of said second pair of members, and another parallel motion link connecting said second pair of members and placed under compression by the inward thrust on said bearing of said first pair of members.

8. Apparatus associated with a roll housing for the retention therein of a bearing, comprising a pair of pivoted devices on each side of said bearing, for engagement with oppositely-facing surfaces thereof, and an adjustable-length member connecting each pivoted device to the correspondingly-engaging pivoted device of the other pair.

9. Apparatus associated with a roll housing for the retention therein of a bearing, comprising a set of opposed movable jaws at each side of said housing for gripping engagement with oppositely-facing surfaces of said bearing, and adjustable-length means connecting the corresponding jaws of each set.

10. Apparatus associated with a roll housing for the retention therein of a bearing, comprising a pair of pivoted devices on each side of said bearing, for engagement with oppositely-facing surfaces thereof, in combination with connecting members for the correspondingly-engaging pivoted devices, arranged to have limited parallel motion about the pivots thereof, thereby to avoid cramping of said bearing.

11. Apparatus associated with a roll housing for the retention therein of a bearing, comprising a set of opposed movable jaws at each side of said housing for gripping engagement with oppositely-facing surfaces of said bearing, arms extending from said jaws, and links connecting the arms of corresponding jaws of each set, said links being adjustable in length.

12. In a roll housing or the like, a bearing, and retaining means therefor comprising a pair of members engaging the bearing on opposite sides of the bearing axis and positioned to oppose endwise movement of the bearing in a direction inwardly of the housing, and means connecting said members and arranged to equalize the pressures applied by the members to the bearing.

13. In a roll housing or the like, a bearing, and retaining means therefor comprising a pair of members engaging the bearing on opposite sides of the bearing axis and positioned to oppose endwise movement of the bearing in a direction inwardly of the housing, said members being pivotally mounted on the housing and arranged to be turned in opposite directions by inward movement of the bearing, and a compression link connecting said members and arranged to equalize the pressures applied by the members to the bearing.

14. In a roll housing or the like, a bearing, retaining means therefor located on opposite sides of the bearing axis and engaging the bearing in such a way that endwise movement of the bearing in either direction will move the retaining means, and means connecting the two retaining means and so arranged that movement of one retaining means in either direction will produce an equal movement of the other retaining means in the opposite direction and vice versa, whereby endwise movement of the bearing is prevented in both directions without imparting cramping forces thereto.

MYLES MORGAN.